(12) United States Patent
Polka

(10) Patent No.: US 6,378,954 B1
(45) Date of Patent: Apr. 30, 2002

(54) METHOD AND APPARATUS FOR COVERING THE DISTAL END OF AN AXLE OF A WHEEL

(76) Inventor: John G. Polka, 1335 Margate, Libertyville, IL (US) 60048

( * ) Notice: Subject to any disclaimer, the term of this patent is extended or adjusted under 35 U.S.C. 154(b) by 0 days.

(21) Appl. No.: 09/688,237

(22) Filed: Oct. 16, 2000

(51) Int. Cl.⁷ ............................................... B60B 27/00
(52) U.S. Cl. ................... 301/108.1; 301/37.12
(58) Field of Search ................... 301/108.1, 108.4, 301/108.3, 37.12

(56) References Cited

U.S. PATENT DOCUMENTS

| | | | |
|---|---|---|---|
| 624,936 A | * 5/1899 | Higgin | 301/108.1 |
| 1,889,070 A | * 11/1932 | Hyatt | 301/108.1 |
| 2,264,000 A | * 11/1941 | McKechnie | 301/108.1 |
| 4,167,294 A | * 9/1979 | Okazaki et al. | 301/108.1 |
| 4,183,587 A | * 1/1980 | Spisak | 301/108.1 |
| 4,223,951 A | * 9/1980 | Muramatsu et al. | 301/37.12 |
| 4,470,638 A | 9/1984 | Bartylla | |
| 5,042,881 A | 8/1991 | Polka | |
| 5,061,014 A | 10/1991 | Polka | |
| 5,152,584 A | * 10/1992 | Maxwell, Jr. | 301/37.12 |
| 5,358,313 A | 10/1994 | Polka | |
| 5,366,279 A | 11/1994 | Polka | |
| 5,529,386 A | * 6/1996 | Walters | 301/108.1 |
| 5,630,653 A | 5/1997 | Polka | |
| 5,676,430 A | 10/1997 | Wright et al. | |
| 5,823,635 A | 10/1998 | Polka | |
| 5,876,099 A | 3/1999 | Irgens-Moller et al. | |
| 6,206,479 B1 | * 3/2001 | Jackman et al. | 301/108.1 |

\* cited by examiner

*Primary Examiner*—S. Joseph Morano
*Assistant Examiner*—Long Bao Nguyen
(74) *Attorney, Agent, or Firm*—Robert L. Marsh

(57) ABSTRACT

To retain a decorative tubular cover over the distal end of the axle of a wheel, a strap having a plurality of retainers thereon is tightened around the circumference of the axle. A tubular flexible member is fitted in the retainers and around the strap, after which the outer surface of the flexible member is compressed and forced into the open end of the tubular cover.

10 Claims, 3 Drawing Sheets

METHOD AND APPARATUS FOR COVERING THE DISTAL END OF AN AXLE OF A WHEEL

The present invention relates to a method for installing a decorative covering over the distal end of the axle of a wheel and, in particular, for axles of certain trailers and trucks which have outer diameters that are substantially less than the inner diameters of the conventional covers manufactured for use on truck axles.

BACKGROUND OF THE INVENTION

The rear wheels of trucks have a generally cylindrical section around which a tire is secured by lug nuts extending through a flange mounted on the axle. The distal end of the axle typically has a removable oil hub into which lubricating material may be inserted.

The portion of a truck axle which extends through the central opening of a wheel is typically 8½" in diameter. Many manufacturers market a decorative covering or "high hat" for enclosing the distal end of a truck axle and these decorative covers have an inner diameter which is a little larger than the 8½" diameter of the wheel. There are many methods for retaining such a covering over a truck axle and one method that can be used with an 8½" diameter axle is set forth in my prior patent, U.S. Pat. No. 5,366,279 issued Nov. 22, 1994.

On the other hand, certain smaller classes of trucks and trailers have axles with distal ends extending through the wheels thereof that are only 6½" in diameter. A tubular covering with an inner diameter sized to fit an 8½" diameter axle cannot be retained over the distal end of an axle with a diameter of 6½" by employing the apparatus disclosed in my prior patent. There is, therefor, a need for a method for retaining a decorative axle cover over the distal end of axles having diameters of 6½".

One method of covering an axle having a diameter of less than 8½" is to provide a covering with a correspondingly smaller inner diameter. The introduction of additional sized of covers would, however, generate marketing complications because distributors would be required to allocate additional space to accommodate the new product size. It would be preferable, therefore, to provide a method whereby currently available decorative enclosures having an inner diameter sized to fit over an 8½" axle can be retained over an axle having an outer diameter of only 6½.

SUMMARY OF THE INVENTION

Briefly, the present invention is embodied in an attachment for retaining a generally tubular cover with an open end and a closed end over the distal end of a generally cylindrical axle. To retain the cover an annular strap is provided which can be tightened around the circumference of the axle so as to be retained in place. The strap has a plurality of claw-shaped retainers spaced around the circumference thereof which project radially outwardly and fitted within the claw-shaped retainers is a tubular compressible member. The tubular cover is then fitted over the compressible member and is retained in place by radially outwardly directed forces applied by the partially compressed compressible member.

GENERAL DESCRIPTION OF THE DRAWINGS

A better and more complete understanding of the present invention will be had after a reading of the following detailed description taken in conjunction with the drawings wherein.

DETAILED DESCRIPTION OF THE PREFERRED EMBODIMENT

Figure 1:
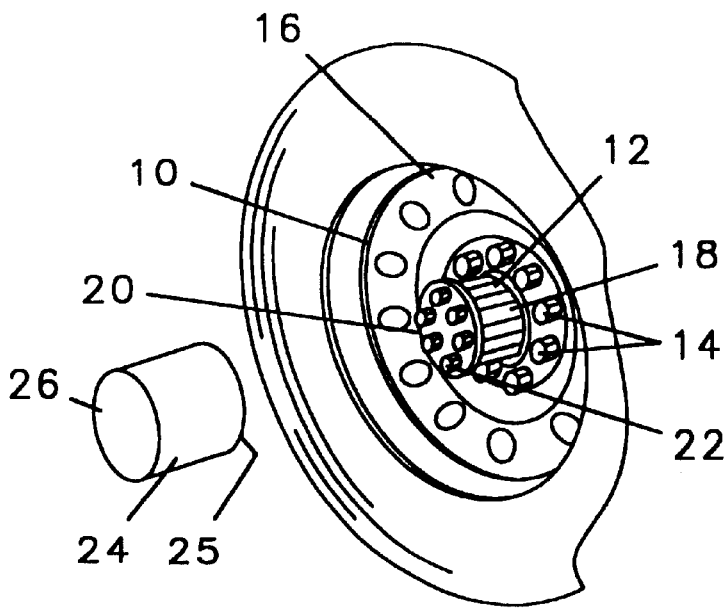
FIG. 1 is a fragmentary isometric view of a truck wheel having the distal end of an axle projecting through the center of the wheel.

Referring to FIG. 1, the wheel 10 of a truck or trailer, not shown, is retained around the distal end of the axle 12 by a plurality of lug nuts 14—14 which are fitted over lugs, not shown, extending through holes in a web 16 of the wheel 10. The distal end of the axel 12 has a surface which defines a cylinder, although the cylindrical surface may be interrupted by a plurality of longitudinal grooves 18, as shown. The distal end of the axle 12 may have an oil cap 20 retained thereon by a plurality of bolts 22. To enhance the appearance of the central portion of the wheel 10, the end of the axle 12 may be covered by a generally tubular covering 24 having an open end 25 and a closed end 26.

Figure 2:
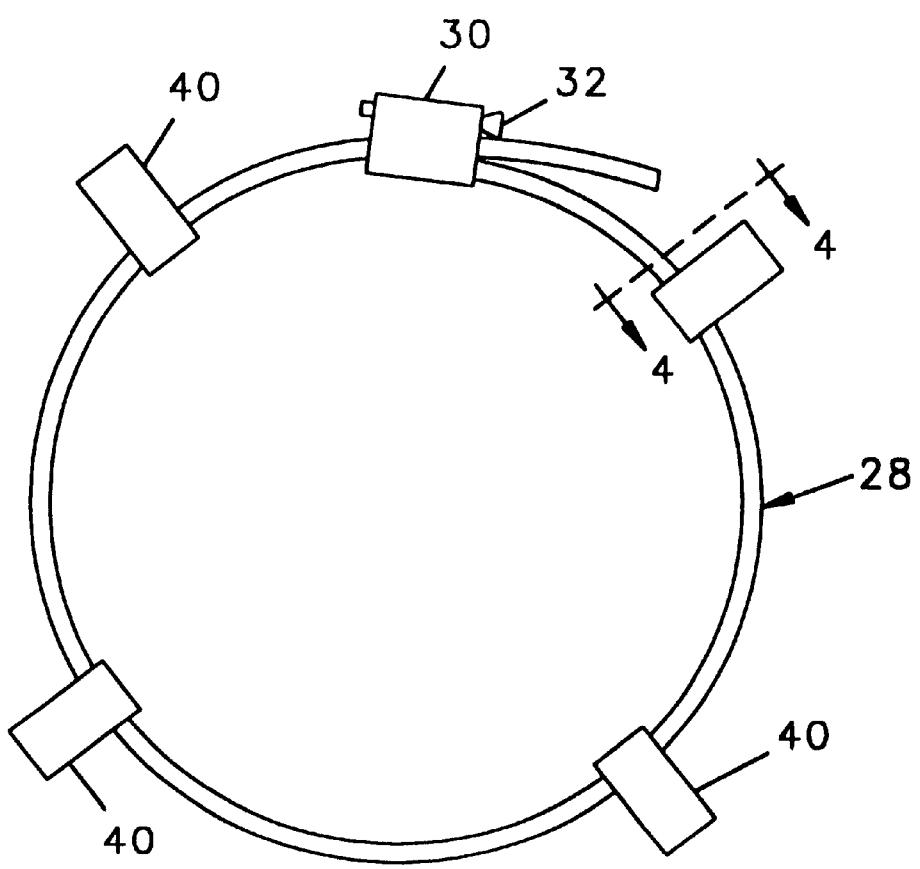
FIG. 2 is an enlarged front elevational view of an annular strap with retainers attached thereto in accordance with the present invention.
Figure 3:
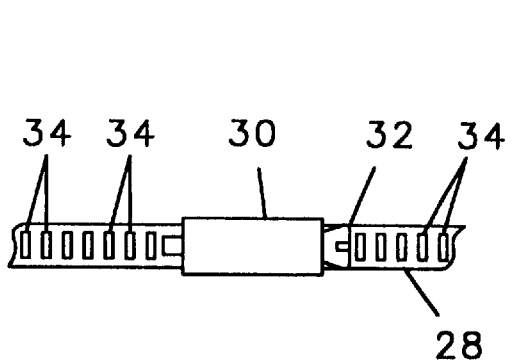
FIG. 3 is a fragmentary top view of the strap shown in FIG. 1.
Figure 4:
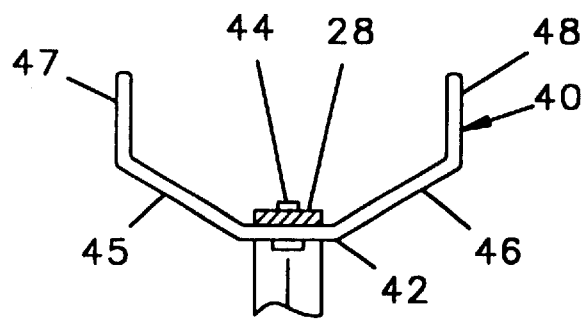
FIG. 4 is a cross sectional view of a strap taken through line 4—4 of FIG. 2 showing the configuration of a retainer attached to the strap.

Referring to FIGS. 2, 3 and 4, to retain the cover 24 over the cylindrical outer surface of the axle 12, a generally flexible adjustable metal strap 28 is fitted around the circumference of the axle 12. In the preferred embodiment, the strap 28 is of the type commonly known as a hose clamp and includes an adjustable connector 30 at one end thereof. The adjustable connector 30 has a screw 32 therein the threads of which engage a plurality of space transverse slots 34 in the opposite end of the strap 28 and act as a worm gear. Rotation of the screw 32 in one direction reduces the circumference of the strap 28 and rotation of the screw 32 in the opposite direction lengths the circumference thereof. A screwdriver can be used to rotate the screw 36 to loosen or tighten the strap 28 around the circumference of the axle 12.

Referring to FIGS. 2 and 4, attached at several locations around the circumference of the strap 28 are a plurality of retainers 40. Each retainer 40 has a central section 42 which is retained by a rivet 44, or the like, to the strap 28. Extending outwardly from each side of the central section 42 is a pair of opposing arms 45, 46, having radially outwardly directed prongs 47, 48 at the distal ends thereof, respectively.

Figure 5:
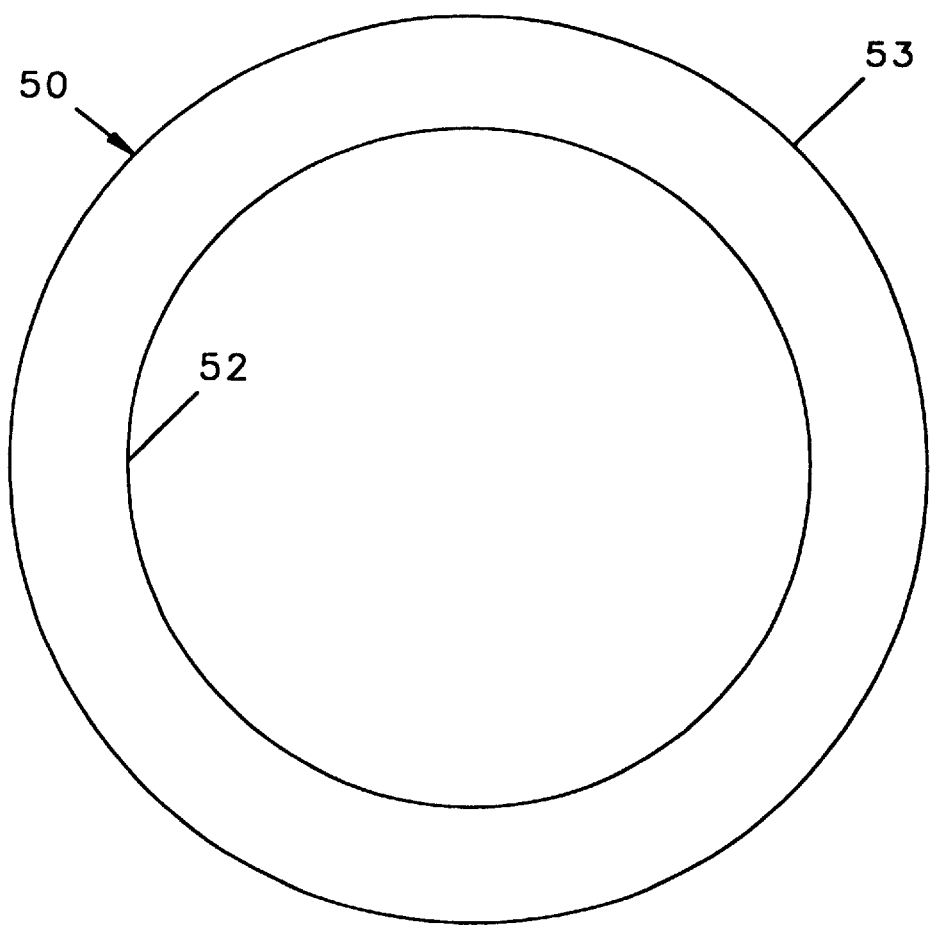
FIG. 5 is a front elevational view of a compressible member suitable for use with the strap and retainers of FIG. 2.
Figure 6:
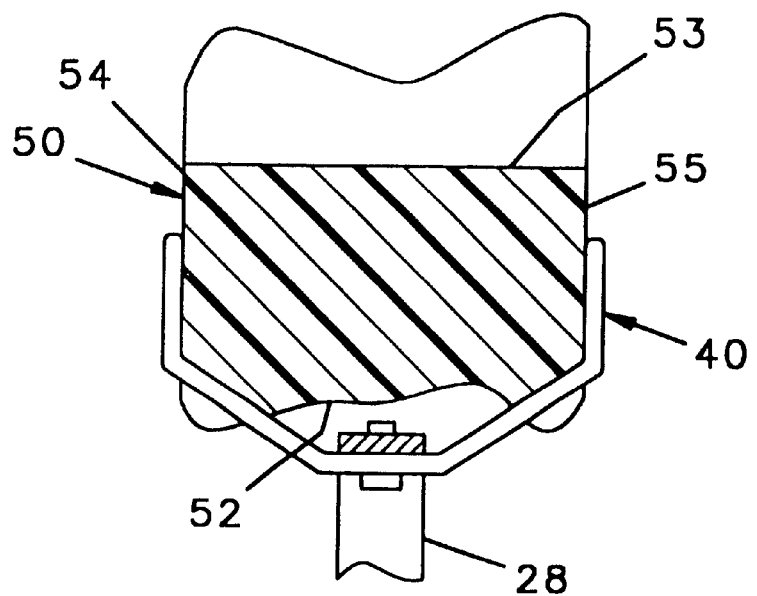
FIG. 6 is a cross sectional view of the strap and retainer, as shown in FIG. 4, with the compressible member of FIG. 5 retained therein.

Referring to FIGS. 5 and 6, the invention further includes a tubular compressible member 50 which may be made of a foam or rubber. The compressible member 50 has an inner surface 52 with a diameter approximately equal to the outer diameter of the axle 12, an outer surface 53 with diameter a little larger than the inner diameter of a cover 24, and opposing annular side surfaces 54, 55. As best shown in FIG.

6, the compressible member 50 is retained with the side surfaces 54, 55 between the prongs 47, 48 of the retainers 40 to thereby retain the compressible member 50 against axial movement along the axle 12.

Figure 7:
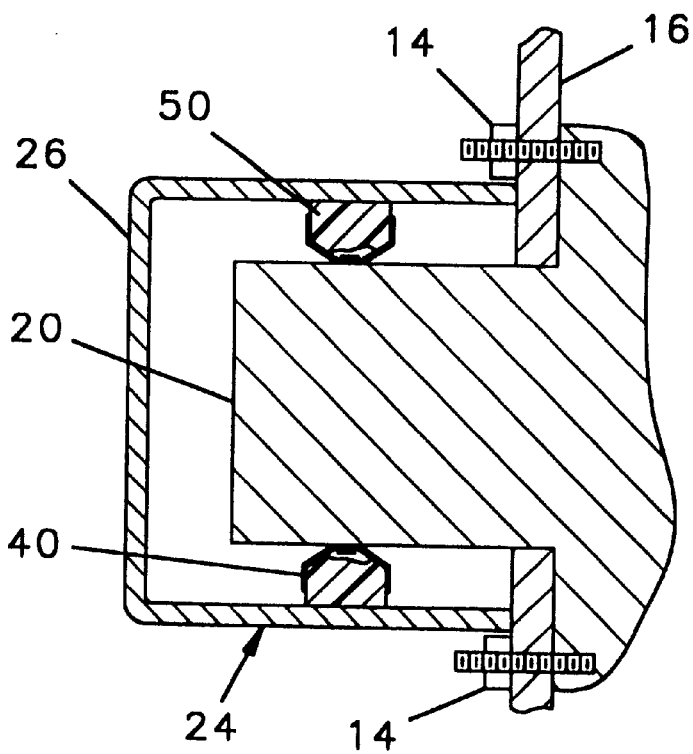
FIG. 7 is a fragmentary cross sectional view, reduced in size, of the distal end of an axle of a vehicle with a covering retained thereon employing the strap, the retainers, and the compressible member show in FIGS. 2 through 6.

Referring to FIG. 7, with the compressible member 50 retained against axial movement with respect to the axle 12, the open end 25 of the tubular cover 24 is fitted over the outer circumference of the compressible member 50 until the open end 25 butts against the surface of the web 16 of the wheel 10. To fit the cover over the compressible member 50, the outer portions of the compressible member 50 must be manually compressed and stuffed into the open end 25 of the cover 24. The cover 24 will thereafter be pushed against the web 16 where it will be retained by the radially outwardly directed forces of the compressible member 50.

While the present invention has been disclosed with respect to a single embodiment, it Will be appreciated that many modifications and variations may be made without departing from the true spirit and scope of the invention. It is, therefore, the intent of the appended claims to cover all such modifications and variations which fall within the true spirit and scope of the invention.

What is claimed:

1. A cover for the distal end of an axle of wheel, said distal end having a generally cylindrical outer surface, said cover comprising an annular strap having an outer surface and an inner surface, said strap for fitting around said generally cylindrical distal end, a plurality of retainers projecting radially outwardly of said outer surface of said strap, a tubular compressible member fitted around said strap and retained with respect to said strap by said retainers, and a tubular cover having and open end and a covered end, said tubular cover fitted over said tubular compressible member.

2. A cover in accordance with claim 1 wherein said plurality of retainers further comprise a pair of axially extending arms with radially outwardly directed prongs at the distal ends thereof.

3. A cover in accordance with claim 1 wherein said annular strap is radially adjustable.

4. A cover in accordance with claim 2 wherein said radially adjustable strap further comprises a screw.

5. The method of covering the distal end of the axle of a wheel having a generally cylindrical outer surface comprising the steps of providing an annular strap having an inner surface and an outer surface and having a plurality of retainers projecting radially outwardly from said outer surface thereof, positioning said annular strap around said distal end of said axle with said inner surface against said generally cylindrical outer surface of said axle, providing an annular compressible member having opposing parallel annular side surfaces, an inner surface and an outer surface, fitting said annular compressible member around said strap with said inner surface of said compressible member against said outer surface of said strap and said parallel annular side surfaces retained by said retainers, providing a tubular cover having an open end and a closed end, and fitting said tubular cover over said outer surface of said compressible member and over said retainers.

6. The method of claim 5 wherein said strap is radially adjustable.

7. The method of claim 5 wherein each of said retainers comprises a pair of axially extending arms with radially outwardly directed prongs at the distal ends thereof.

8. A kit for retaining a tubular cover having an open end and a closed end over an axle having a generally cylindrical distal end, said kit comprising, an annular strap having an adjustable inner diameter wherein said strap is tightenable around said cylindrical diameter of said axle, said strap having a plurality of retainer clips thereon, each of said retainer clips having at least one radially extending prong, and a tubular compressible member having an inner diameter no greater than an outer diameter of said axle, and an outer diameter greater than said inner diameter of said cover wherein said compressible member is compressable between an outer surface of said strap and said inner said surface of said tubular cover.

9. A kit in accordance with claim 8 wherein said retainers further comprise a pair of axially extending arms having radially outwardly directed prongs at the distal ends thereof.

10. A kit in accordance with claim 8 wherein said annular strap further comprises a screw with threads and said threads fit in slots and act as a worm gear.

* * * * *